(12) United States Patent
Korhonen

(10) Patent No.: US 10,960,567 B2
(45) Date of Patent: Mar. 30, 2021

(54) GUIDE BARS FOR CHAIN SAWS

(71) Applicant: Fomatec Oy, Kuopio (FI)

(72) Inventor: Marko Korhonen, Kuopio (FI)

(73) Assignee: Fomatec Oy, Kuopio (FI)

( * ) Notice: Subject to any disclaimer, the term of this patent is extended or adjusted under 35 U.S.C. 154(b) by 321 days.

(21) Appl. No.: 15/761,457

(22) PCT Filed: Dec. 4, 2017

(86) PCT No.: PCT/FI2017/050858
§ 371 (c)(1),
(2) Date: Mar. 20, 2018

(87) PCT Pub. No.: WO2019/110866
PCT Pub. Date: Jun. 13, 2019

(65) Prior Publication Data
US 2020/0238563 A1    Jul. 30, 2020

(51) Int. Cl.
| | | |
|---|---|---|
| *B27B 17/02* | (2006.01) |
| *A01G 23/091* | (2006.01) |
| B27B 17/00 | (2006.01) |
| B27B 17/08 | (2006.01) |
| B27B 17/12 | (2006.01) |
| B27G 19/00 | (2006.01) |

(52) U.S. Cl.
CPC .......... *B27B 17/025* (2013.01); *A01G 23/091* (2013.01); *B27B 17/0083* (2013.01); *B27B 17/08* (2013.01); *B27B 17/12* (2013.01); *B27G 19/003* (2013.01)

(58) Field of Classification Search
CPC ... B27B 17/02; B27B 17/025; B27B 17/0083; B27B 17/08; B27B 17/12; A01G 23/091; B27G 19/003
See application file for complete search history.

(56) References Cited

U.S. PATENT DOCUMENTS

| | | | | |
|---|---|---|---|---|
| 2,962,061 | A | * | 11/1960 | Nielsen .................. B27B 17/12 30/123.4 |
| 3,881,533 | A | | 5/1975 | Savage et al. |
| 4,334,358 | A | * | 6/1982 | Reynolds ............ B27B 17/0033 30/387 |
| 5,093,998 | A | | 3/1992 | Seigneur et al. |
| 5,216,814 | A | * | 6/1993 | McGregor ............ B27B 17/025 30/123.4 |
| 5,564,192 | A | | 10/1996 | Wilhelm et al. |
| D714,104 | S | * | 9/2014 | Cotter ......................... D7/401.2 |
| 2003/0167642 | A1 | | 9/2003 | Chen |
| 2008/0178478 | A1 | | 7/2008 | Chang |
| 2008/0276467 | A1 | * | 11/2008 | Schmidt .................... B26B 3/00 30/340 |
| 2015/0328781 | A1 | * | 11/2015 | Chen ........................ B26B 3/00 30/165 |
| 2020/0238563 | A1 | * | 7/2020 | Korhonen ............... B27B 17/02 |

* cited by examiner

*Primary Examiner* — Hwei-Siu C Payer
(74) *Attorney, Agent, or Firm* — Laine IP Oy

(57) ABSTRACT

A guide bar for a chain saw comprising two opposite elongate surfaces and a slot formed between said opposite sides running along the periphery of the guide bar, in order to receive and retain the chain during cutting. At least one of the elongate surfaces is furrowed across its surface in the direction of the cutting movement of the guide bar. The invention also relates to an apparatus for operating the chain saw in a forestry machine.

10 Claims, 2 Drawing Sheets

GUIDE BARS FOR CHAIN SAWS

FIELD

The invention concerns a guide bar for a chain saw. Such guide bars are, for example, used in chain saws and in forestry machines, such as harvesters.

BACKGROUND

Forestry machines are usually equipped with chain saws that automatically cut the log being processed in predetermined and/or optimal lengths. A chain saw includes a power unit and a guide bar, which in laminated guide bars includes two metal plates and a spacer plate, which is sandwiched between the two guide plates. Guide bars made of solid material are also known. Along the outer edge of the guide bar runs a slot that receives the chain therein.

Especially in forestry machines, wood cutting is performed with high speed, which imposes high wear and heat on the chain saw blade and the guide bar. Also, when cutting objects, the chain vibrates and the shocks are transferred to the guide bar and the whole chain saw equipment. This causes need for regular and frequent maintenance.

OBJECT OF THE INVENTION

It is an object of the present invention to offer improved guide bars for chain saws, that alleviates the problems mentioned above and that increases the productivity of a chain saw equipment.

SUMMARY OF THE INVENTION

The invention is defined by the features of the independent claims. Some specific embodiments are defined in the dependent claims.

According to a first aspect of the present invention, a guide bar for a chain saw is provided, comprising two opposite elongate surfaces and a slot formed between the opposite sides running along the outer edge of the guide bar. The slot will receive and retain the chain during cutting. According to the invention, at least one of the elongate surfaces is furrowed across its surface in the direction of the cutting movement of the guide bar. The furrow may take the shape of indentations, ridges or alternating between both in the surface of the elongate surface.

According to some embodiments, the furrow may be shaped radially, i.e. having a radius. The radius may preferably vary along the guide bar so that the radius for each indentation and/or ridge is the distance from a pivot or fastening point at one end of the guide bar to each indentation and/or ridge, respectively. In other words, each indentation and/or ridge with their radiuses forms a sector of a respective circle having a common center such that the furrows are concentrically arranged.

According to a second aspect of the invention, an apparatus for operating a chain saw in a forestry machine is provided. The apparatus comprises a power unit to drive the chain, a pivoted guide bar comprising two opposite elongate surfaces and a slot formed between said opposite sides along the outer edge of the guide bar in order to receive and retain the chain during cutting, and a mechanism to move said pivoted guide bar in a cutting direction, wherein at least one of the elongate surfaces is furrowed across its surface in the cutting direction of the guide bar.

The invention provides significant improvements, in that when the chain saw is cutting wood or other materials, the friction between the guide bar and the wood or other material being cut is reduced as the guide bar is moving in its cutting direction through the log or other material, such as concrete or stone. This makes the sawing operation more efficient. In addition, a furrowed guide bar is more rigid than a guide par with plain surfaces. Also, the vertically or radially oriented indentations and/or ridges across the guide bar may also assist in distributing the chain saw oil or cooling water across the guide bar, further reducing the friction between the saw and the wood.

EMBODIMENTS

Definitions

Furrowed/furrow—is a term similar to corrugated, but is used in the disclosure to cover the situation where the surfaces of the guide bar may have either only indentations or only ridges, and to cover cases where the alternating structures, i.e. indentations vs. plane surface, ridges vs. plane surface, or indentations vs. ridges, are not necessarily mutually symmetrical in any way (as in corrugation), but may have a different shape, width, depth and so on.

Figure 1:
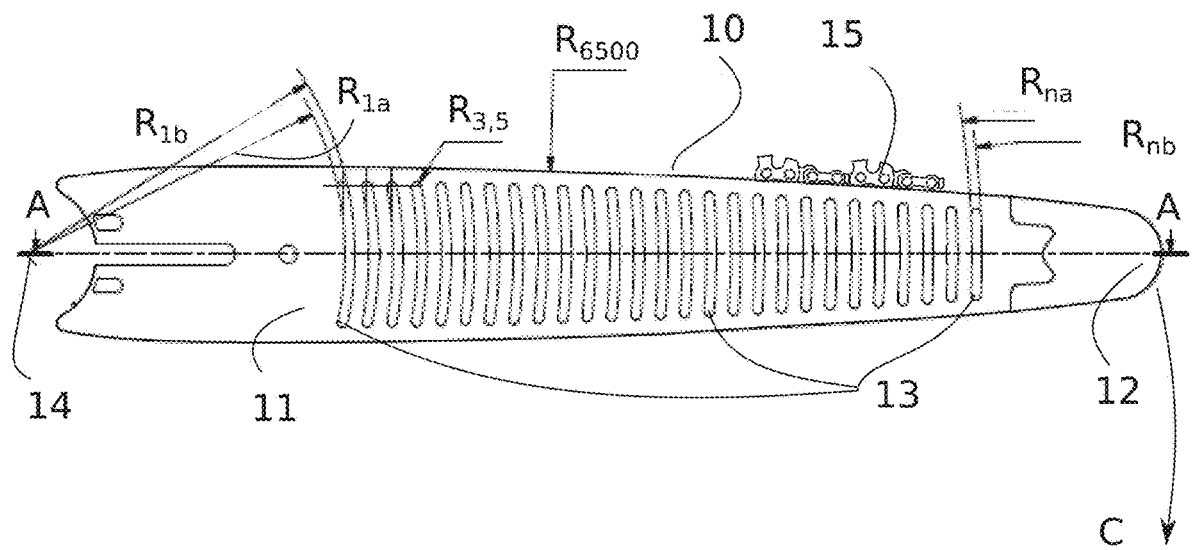
FIG. 1 illustrates a side view of a guide bar in accordance with at least some embodiments of the present invention.

FIG. 1 shows an inventive guide bar 10 for a chain saw, comprising two opposite elongate surfaces 11. A slot (see FIG. 2s 2A-2C) is formed between the opposite sides and is running along the periphery of the guide bar and which receives the chain 15 (not in exact scale and only a section shown). At the end 12 of the guide bar there may be a lubricated sprocket wheel in the slot, for supporting and guiding the chain. According to the invention, at least one of the elongate surfaces 11 is furrowed 13 across its surface in the direction C of the cutting movement of the guide bar 10.

Figure 2A:
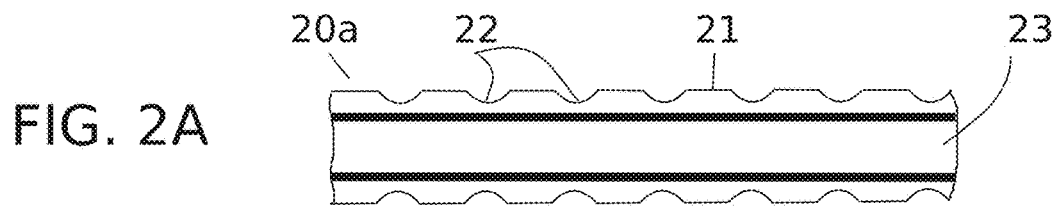
FIG. 2A-2C illustrates exemplary cross-sections in the plane A-A of FIG. 1 in accordance with at least some embodiments of the present invention.

According to some embodiments, see FIG. 2A, the furrow is provided by indentations 22 in both the opposite surfaces 21 of the elongate bar guide 20a, enclosing between them a slot 23 for the chain.

Figure 2B:
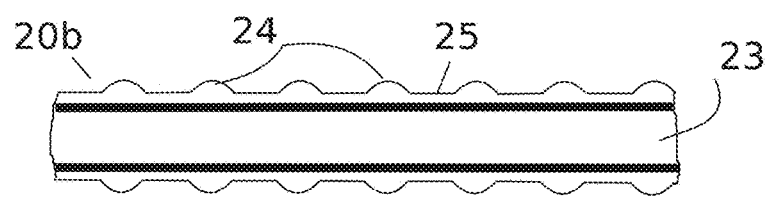

According to some embodiments, see FIG. 2B, the furrow is provided by ridges 24 on both the opposite surfaces 25 of the elongate bar guide 20b, enclosing between them a slot 23 for the chain.

Figure 2C:
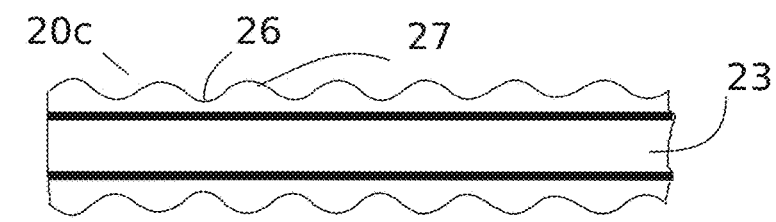

According to some embodiments, see FIG. 2C, the furrow is provided by alternate indentations 26 and ridges 27 in both the opposite surfaces of the elongate bar guide 20c, enclosing between them a slot 23 for the chain.

According to some embodiments, the furrow 13 across the surface 11 of the guide bar 10 is formed as a section of the periphery of a circle, thus having a radius. According to one useful embodiment, each indentation and/or ridge with their radiuses $R_{1a}$, $R_{1b}$-$R_{na}$, $R_{nb}$, forms a sector of a respective circle having a common center 14 such that the furrows are concentrically arranged.

The number (n) of indentations and/or ridges on the guide bar 10 may vary considerably, depending on the equipment (speed, lubrication, guide bar material etc.), the material (wood hardness etc.) to be sawed, and/or on outer circumstances, such as humidity.

Figure 3:
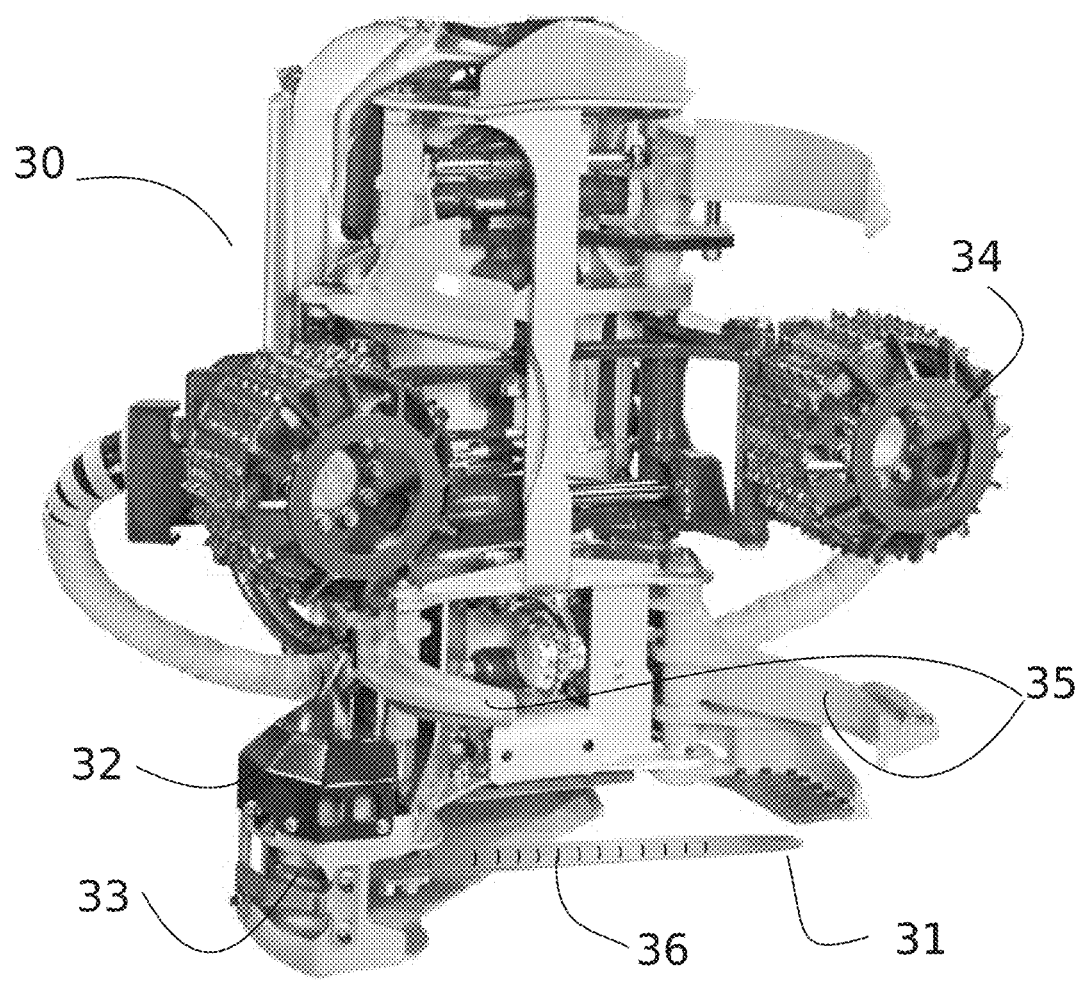
FIG. 3 illustrates an apparatus for operating a chain saw in a forestry machine in accordance with at least some embodiments of the present invention.

In FIG. 3 is shown an exemplary apparatus 30 for operating a chain saw in a forestry machine. The apparatus comprises an engine or hydraulic power unit 32 to drive the chain (not shown) on the guide bar 31, which is furrowed 36 as described above. The guide bar 31 is pivoted with a mechanism 33 in order to move the guide bar in a cutting direction. The apparatus 30 further comprise roller means 34 for forwarding the log (not shown) to a cutting position and clamping means 35 for keeping the log in position.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For example, the concept of a chain saw should be interpreted to encompass all types of saws having a guide bar and a chain, independently of the type of the chain drive and the purpose of the saw. Also the guide bar is to be interpreted to cover all guide bars carrying a chain, i.e. also guide bars with special functions, such as stump pesticide (e.g. urea) treatment guide bars.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A guide bar for a chain saw comprising two opposite elongate surfaces and a slot formed between said opposite surfaces running along the outer edge of the guide bar, in order to receive and retain a chain of the chain saw during cutting, wherein at least one of the elongate surfaces has furrows across its surface in the direction of the cutting movement of the guide bar, and wherein the furrows form sectors of a respective circle having a common center so that the furrows are concentrically arranged.

2. The guide bar for a chain saw according to claim 1, wherein the furrows are indentations in the surface of said at least one elongate surface.

3. The guide bar for a chain saw according to claim 1, wherein the furrows are ridges on the surface of said at least one elongate surface.

4. The guide bar for a chain saw according to claim 1, wherein the furrows are alternate indentations and ridges in the surface of said at least one elongate surface.

5. The guide bar for a chain saw according to claim 1, wherein the furrows across the surface of said at least one elongate surface are shaped radially.

6. An apparatus for operating a chain saw in a forestry machine, said apparatus comprising a power unit to drive the chain of the chain saw, a pivoted guide bar comprising two opposite elongate surfaces and a slot formed between said opposite elongate surfaces running along the periphery of the guide bar in order to receive and retain the chain during cutting, wherein at least one of the elongate surfaces has furrows across its surface in the direction of the cutting movement of the guide bar, and wherein the furrows form sectors of a respective circle having a common center so that the furrows are concentrically arranged.

7. The apparatus for operating a chain saw according to claim 6, wherein the furrows are indentations in the surface of said at least one elongate surface of the guide bar.

8. The apparatus for operating a chain saw according to claim 6, wherein the furrows are ridges in the surface of said at least one elongate surface of the guide bar.

9. The apparatus for operating a chain saw according to claim 6, wherein the furrows are alternate indentations and ridges in the surface of said at least one elongate surface of the guide bar.

10. The apparatus for operating a chain saw according to claim 6, wherein the furrows across the surface of said at least one elongate surface of the guide bar are shaped radially.

\* \* \* \* \*